(12) United States Patent
Ahmed

(10) Patent No.: US 7,919,052 B2
(45) Date of Patent: Apr. 5, 2011

(54) SECURING CATALYST ELEMENT IN CATALYTIC CONVERTER WITH BOLTED BAR

(75) Inventor: Mehmood Ahmed, Mississauga (CA)

(73) Assignee: Silex Innovations Inc., Mississauga, ON (CA)

( * ) Notice: Subject to any disclaimer, the term of this patent is extended or adjusted under 35 U.S.C. 154(b) by 913 days.

(21) Appl. No.: 11/878,903

(22) Filed: Jul. 27, 2007

(65) Prior Publication Data

US 2009/0025376 A1    Jan. 29, 2009

(51) Int. Cl.
*B01D 53/38* (2006.01)
(52) U.S. Cl. .......................... 422/179; 422/180
(58) Field of Classification Search ............. 422/177, 422/179, 180, 219; 60/295, 299
See application file for complete search history.

(56) References Cited

U.S. PATENT DOCUMENTS

| | | | |
|---|---|---|---|
| 3,938,232 A | 2/1976 | Noda et al. | |
| 4,004,887 A | 1/1977 | Stormont | |
| 4,161,509 A | 7/1979 | Nowak | |
| 4,350,664 A | 9/1982 | Gaysert | |
| 4,448,754 A | 5/1984 | Isogai et al. | |
| 5,169,604 A * | 12/1992 | Crothers, Jr. | 422/177 |
| 5,211,012 A | 5/1993 | Swars | |
| 5,387,399 A | 2/1995 | Nishida et al. | |
| 5,415,772 A | 5/1995 | Garcera et al. | |
| 5,582,003 A | 12/1996 | Patil et al. | |
| 5,746,986 A * | 5/1998 | Pollock et al. | 422/177 |
| 6,217,832 B1 | 4/2001 | Betta et al. | |
| 7,157,060 B1 | 1/2007 | Newburry | |
| 7,163,666 B2 | 1/2007 | Barnes | |
| 7,410,621 B2 * | 8/2008 | Muter et al. | 422/180 |
| 2004/0156761 A1 | 8/2004 | Bruck et al. | |
| 2005/0271561 A1 | 12/2005 | Lancaster et al. | |
| 2006/0159597 A1 | 7/2006 | Muter et al. | |
| 2006/0177359 A1 | 8/2006 | Sinha et al. | |

* cited by examiner

*Primary Examiner* — Sean E Conley
*Assistant Examiner* — Joye L Woodard

(57) ABSTRACT

A catalytic converter has a housing. The housing defines a conduit and has a support wall defining an opening in the conduit. A removable catalyst element covers the opening for treating an exhaust gas passing through the conduit. A removable bar abuts the catalyst element. A first end of the bar is anchored to the wall and a second end of the bar is bolted to the wall thus clamping the catalyst element between the wall and the bar.

31 Claims, 13 Drawing Sheets

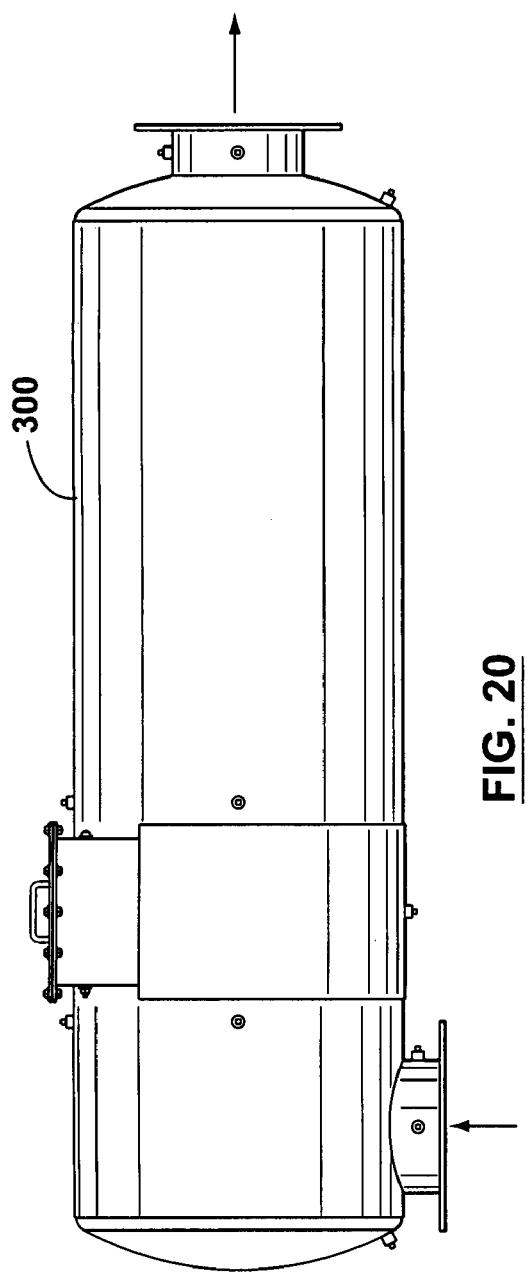
FIG. 20
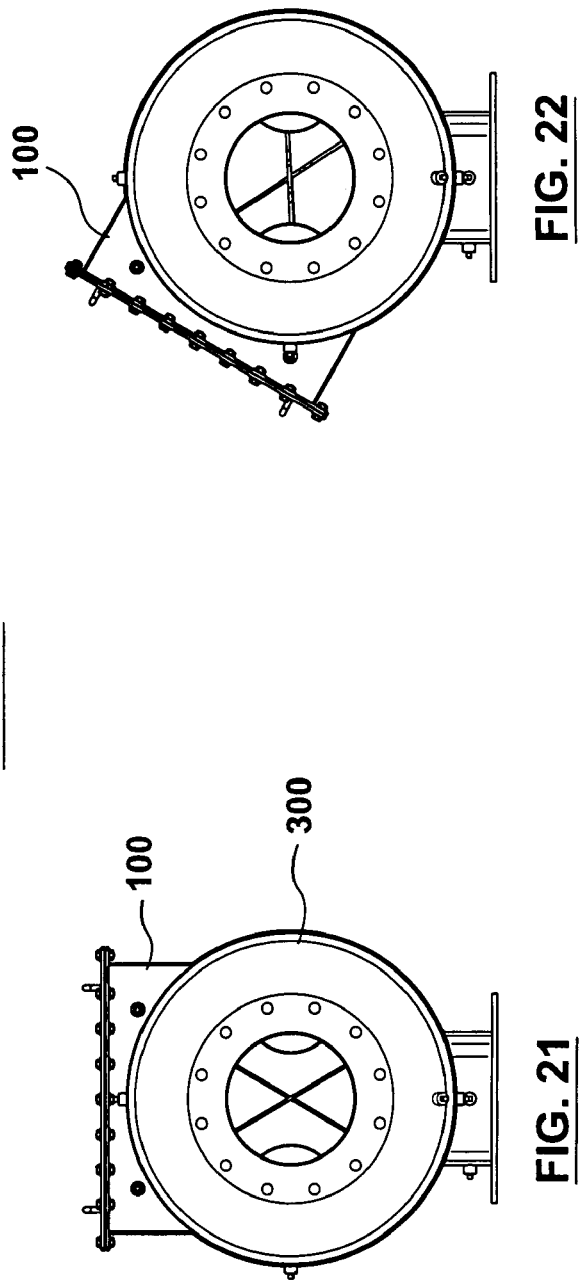
FIG. 22
FIG. 21

SECURING CATALYST ELEMENT IN CATALYTIC CONVERTER WITH BOLTED BAR

FIELD OF THE INVENTION

The present invention relates generally to catalytic converters, and particularly to methods and devices for securing a catalytic element in a catalytic converter.

BACKGROUND OF THE INVENTION

A catalytic converter is a device that catalyzes chemical reactions in which a combustion by-product or emission substance (such as CO, $NO_x$, or the like) is converted to a more environmentally-friendly or less undesirable substance (such as $CO_2$, $H_2O$, $N_2$, or the like). Catalytic converters are commonly used for emission control by providing a catalyst environment (typically without consumable chemicals) to treat exhaust gases from, e.g., internal combustion engines, air conditioning systems, or the like. Typically, a catalytic converter includes a disk or block-shaped catalyst element mounted in a housing, and is placed in the exhaust path of an emission producing system or machine. It is desirable that the catalyst element is readily replaceable. It is also desirable to form a leak-proof seal between the catalyst element and the housing wall so that all the exhaust gas will go through the catalyst element to maximize conversion. In conventional catalytic converters, different fixture assemblies have been used to secure the catalyst element in position. However, these fixture assemblies suffer some drawbacks. For instance, in conventional catalytic converters, one cannot conveniently adjust the pressure applied to the catalyst element for securing it in position and forming a tight seal. Some of them do not apply sufficient pressure to form a stable tight seal; others have complicated structures and are inconvenient to use. They are also not adjustable to accommodate catalyst element size variations. In some conventional catalytic converters, the seal between the catalyst core and the housing is tight but catalyst core is fixedly mounted in the housing and therefore is not removable for maintenance or replacement.

Accordingly, there is a need for a catalytic converter that overcomes one or more of these shortcomings.

SUMMARY OF THE INVENTION

In accordance with a first aspect of the present invention, there is provided a catalytic converter. The catalytic converter has a housing defining a conduit and having a support wall defining an opening in the conduit; a removable catalyst element covering the opening for treating an exhaust gas passing through the conduit, and a removable bar abutting the catalyst element, a first end of the bar anchored to the wall and a second end of the bar bolted to the wall thus clamping the catalyst element between the wall and the bar. The first end of the bar may be removably anchored to the wall. The catalytic converter may have an anchorage mounted in the housing, the anchorage having an aperture releaseably receiving and engaging the first end of the bar thus anchoring the first end. The anchorage may include an elongated arm extending from the wall, the arm having two joined plate members forming a generally L-shaped cross-section, one of the plate members facing the catalyst element and having the aperture. The first end of the bar may have a pin, the pin slidably received in the aperture of the anchor support. The bar may have two opposite edges, one of the edges abutting the catalyst element, the pin extending along a line between, and generally parallel to, the edges, the line being closer to one of the edges. The bar may have a recessed portion between the ends, the recessed portion being spaced from the catalyst element to allow passage of the gas. The bar may have a central portion protruding from the recessed portion towards the catalyst element for restricting expansion of a central portion of the catalyst element. The catalytic converter may include a bolt that bolts the second end of the bar to the wall, the second end of the bar having a sleeve, the bolt extending through the sleeve. The catalytic converter may include a nut and a support plate, the support plate forming the wall and having an aperture, the bolt extending through the aperture and being coupled to the nut such that the bolt and the nut clamp the plate and the bar therebetween. The catalytic converter may include a washer-gasket unit placed between the nut and the support plate. The catalytic converter may have another bar having a first end anchored to the wall and a second end bolted to the wall thus clamping the catalyst element between the wall and the second bar. Each one of the first bar and second bar may have a longitudinal axis, which may be aligned with each other at an angle from 30 to 90 degrees. A central portion of each one of the first and second bars may have a notch, the notches facing each other and being sized to allow the second bar to be positioned across the first bar. The catalytic converter may include a restriction bar mounted in the housing and across the opening of the wall, for restricting expansion of a central portion of the catalyst element. The catalyst element may include a peripheral frame and a catalyst core mounted to the frame, the frame bearing the clamping force applied to the catalyst element by the bar and the wall. The frame may be formed from a material selected from carbon steel and stainless steel. The bar may be anchored and bolted to the wall with an anchorage and a bolt, the bar, wall, anchorage and bolt being formed from respective materials having different thermal expansion coefficients, the materials selected so that the clamping force applied to the catalyst element by the bar and the wall increases with increasing temperature. The clamping force may be sufficiently strong at an elevated operating temperature that the catalyst element sealingly engages the wall, to prevent leakage of the gas through a gap between the wall and the catalyst element. The wall, the bar and the catalyst element may have a first thermal expansion coefficient, and the bolt and the anchorage may have a second thermal expansion coefficient smaller than the first thermal expansion coefficient. The first thermal expansion coefficient may be about $9.6 \times 10^{-6}$ in/in. ° F., and the second thermal expansion coefficient may be about $7.6 \times 10^{-6}$ in/in. ° F. Each one of the wall and the bar may be made of stainless steel, and each one of the bolt and the anchorage may be made of carbon steel. The catalytic converter may comprise a plurality of catalyst elements. The support wall may be an inlet wall and the opening of the support wall may be an inlet opening. The housing may also have an outlet wall defining an outlet opening. Another catalyst element covering the outlet opening may be clamped between the outlet wall and a pressure bar bolted to the outlet wall. The catalyst elements may be independently mounted to the inlet and outlet walls. The catalytic converter may include a flow distributor mounted in the housing upstream of the opening of the wall for distributing the gas over the opening, the flow distributor comprising a cone-shaped tube. The flow distributor may include a plurality of nested, cone-shaped tubes.

In another aspect of the present invention, there is provided a catalytic converter. The catalytic converter comprises a housing defining a conduit and having support means defining an opening in the conduit; a removable catalyst element covering the opening for treating an exhaust gas passing through the conduit, and pressure means abutting the catalyst element, the pressure means bolted to the wall thus clamping the catalyst element between the wall and the pressure means.

In a further aspect of the present invention, there is provided a method of securing a catalyst element in a catalytic converter. A housing is provided which defines a conduit and has a support wall defining an opening in the conduit. The opening is covered with a removable catalyst element for treating an exhaust gas passing through the conduit. The catalyst element is abutted with a pressure bar by anchoring a first end of the bar to the wall and bolting a second end of the bar to the wall, thus clamping the catalyst element between the wall and the bar.

In another aspect of the present invention, there is provided a catalytic converter comprising a housing defining a generally longitudinally oriented conduit extending between an inlet and an outlet, the housing having a generally transversely oriented support wall mounted in the conduit between the inlet and the outlet, the support wall having an opening permitting an exhaust gas to pass through the conduit; a removable catalyst element covering the opening in the support wall for treating the exhaust gas passing through the conduit; the catalyst element having a front side facing the support wall and a rear opposite side; and at least one member abutting and extending across the rear side of the catalyst element, the member having a first end pivotally connected to the housing and a second opposite end of the member connected with a bolt to the support wall wherein in use, the catalyst element is held in compression between the support wall and the member. The bolt may be adjustable to vary the compression of the catalyst element as it is held between the support wall and the member. The second end of the member may be adapted to releasably engage the housing. The second end of the member may have a pin receivable in an aperture in the housing. The housing may include a longitudinally extending arm member and wherein the aperture is in the arm member.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

FIG. 20 is an elevation view of the catalytic converter of FIG. 19;

FIG. 21 is a right elevation view of the catalytic converter of FIG. 20;

FIG. 22 is an elevation view of a variation of the catalytic converter of FIG. 21;

DETAILED DESCRIPTION

Figure 1:
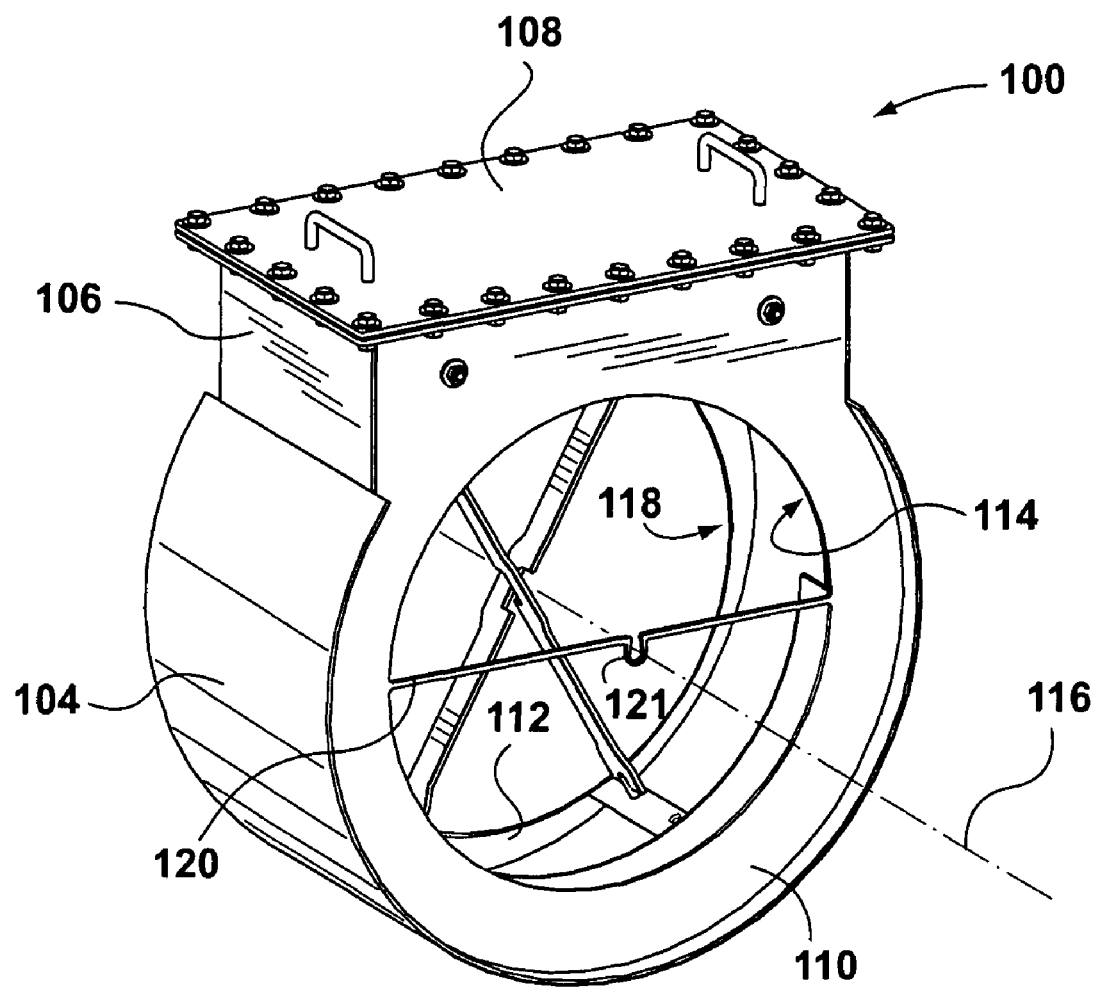
FIG. 1 is an isometric perspective view of a housing of a catalytic converter, for housing a disk-shaped catalyst element.
Figure 2:
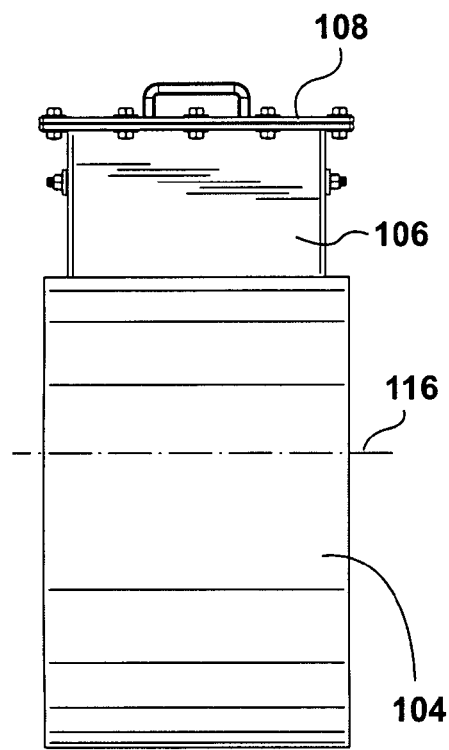
FIG. 2 is a side elevation view of the housing of FIG. 1.
Figure 3:
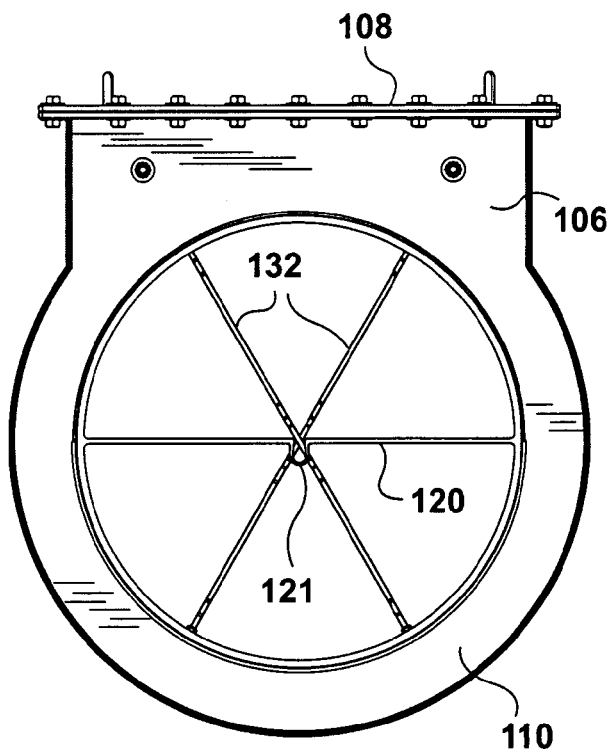
FIG. 3 is a front elevation view of the housing of FIG. 1.
Figure 4:
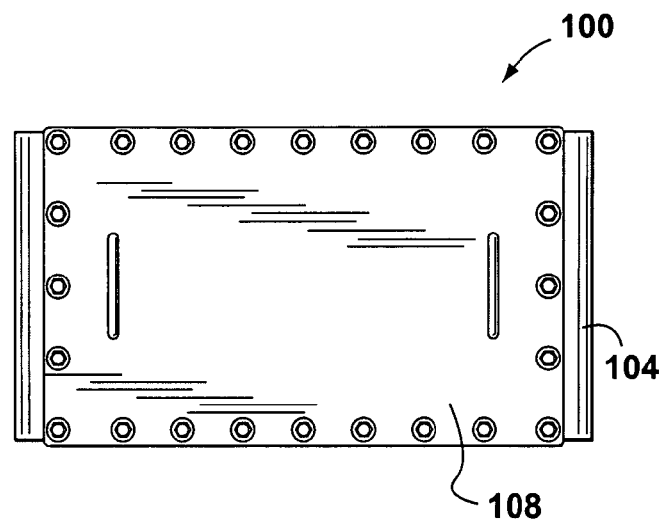
FIG. 4 a top plan view of the housing of FIG. 1.
Figure 5:
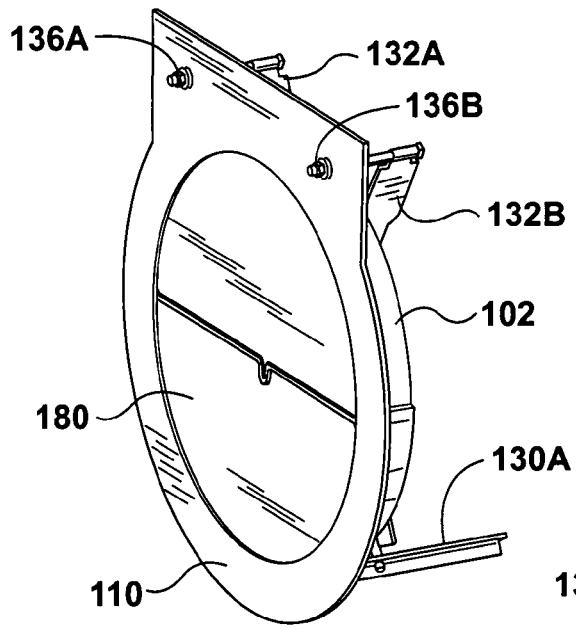
FIG. 5 is a cutaway perspective view of a portion of the housing of FIG. 1.
Figure 6:
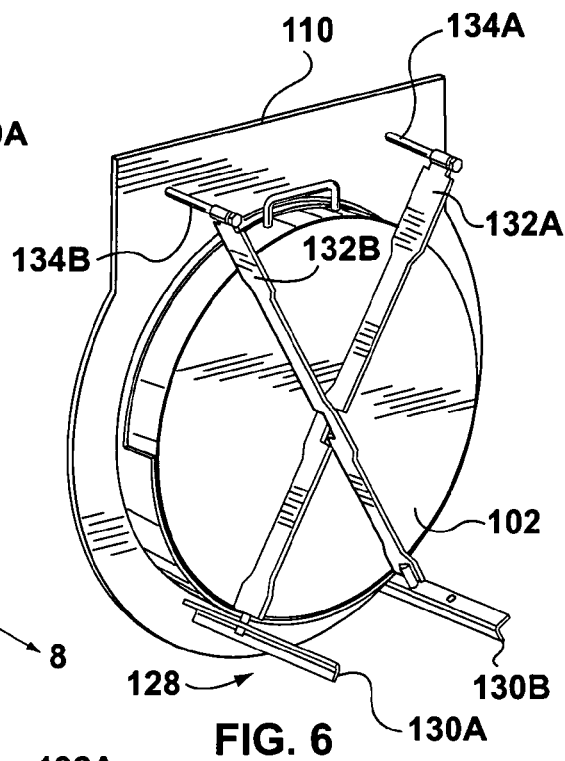
FIG. 6 is a rear perspective view of the portion of FIG. 5.
Figure 7:
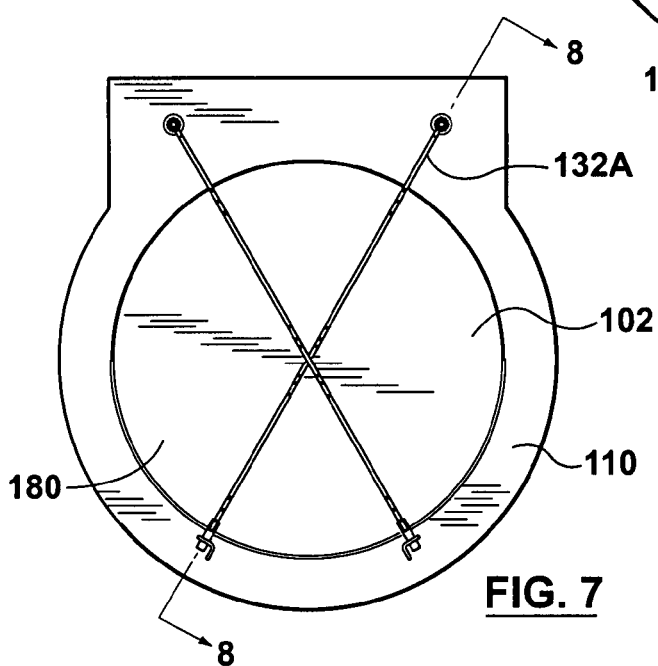
FIG. 7 is a front elevation view of the portion of FIG. 5.

In overview, it is discovered that catalyst elements can be conveniently secured in position using pressure bars that may abut the catalyst element against the converter housing wall and may be bolted to the housing wall so that the pressure bars and the housing wall clamp the catalyst element therebetween. The applied clamping force or pressure can be conveniently adjusted to form a stable and suitable seal between the catalyst element and the wall. The catalyst element can also be installed or removed conveniently.

FIGS. 1 to 9 illustrate a housing 100 for a catalytic converter (not shown in entirety but see FIGS. 15 to 26), exemplary of an embodiment of the present invention. Housing 100 houses a catalyst element 102 (shown in FIGS. 5 to 7). Housing 100 has a main flow chamber 104 and an access channel 106 extending laterally from flow chamber 104. Flow chamber 104 defines a fluid conduit for an exhaust gas to flow through. The exhaust gas may be emitted from an engine or like emission-producing machines or systems.

Catalyst element 102 may be adapted for treating the exhaust gas. Catalyst element 102 may facilitate chemical reaction in exhaust gas that passes through it and may convert certain exhaust pollutants into environmental-friendly, such as less toxic or harmful, substances. Catalyst element 102 can be inserted into or removed from flow chamber 104 through access channel 106. A removable cover 108 is secured on the outer end of access channel 106 for closing housing 100. A sealing ring or gasket (not shown) may be typically placed between the outer end (flange) of access channel 106 and (flange) cover 108 to provide leak-proof seal. Housing 100 may be placed in the exhaust path of an emission-producing machine, such as an engine, so that exhaust gas is forced to go through catalyst element 102, as will be further described below.

Housing 100 includes a front plate 110 and a rear plate 112. Front plate 110 defines an opening 114 around a central axis 116 and rear plate 112 defines an opening 118, for allowing the exhaust gas to go through flow chamber 104 and catalyst element 102. As depicted, openings 114, 118 have a circular profile, which matches the circular end face of catalyst element 102. Either front plate 110 or rear plate 112 may be placed upstream and the other downstream. For illustration purposes, it is assumed herein that front plate 110 is upstream and opening 114 serves as the flow inlet while opening 118 is downstream and serves as the outlet. Thus, housing 100 defines a generally longitudinally oriented fluid conduit between inlet opening 114 and outlet opening 118. Front and rear plates 110, 112 may be generally transversely oriented. A restriction bar 120 is mounted on housing 100 across opening 114, the use of which will become clear below. As depicted, bar 120 may have a loop portion 121 that can expand when opening 118 becomes enlarged due to thermal expansion of plate 110 at elevated temperatures.

Figure 10:
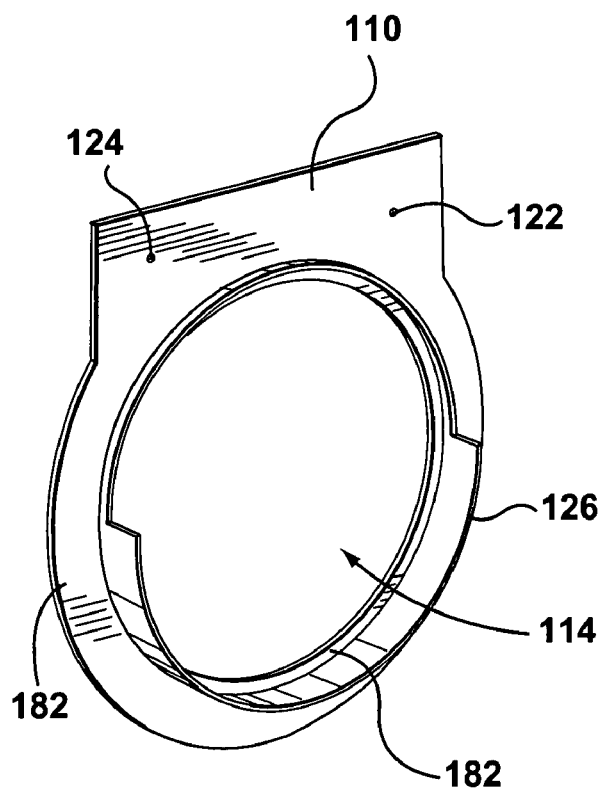
FIG. 10 is a perspective view of the front plate shown in FIG. 6.

As individually shown in FIG. 10, front plate 110 also has two bore holes 122, 124. Plate 110 has a collar 126 around opening 114 for positioning and supporting catalyst element 102. Collar 126 supports and restricts lateral movement of catalyst element 102 relative to axis 116. Collar 126 may have a width selected to provide adequate support for catalyst element 102. As depicted, collar 126 may have a wider bottom portion and a narrower top portion, which can conveniently provide both good support and easy access, as will become clear below.

Plate 110 may have any suitable size depending on the application. Plate 110 should be thick enough to support catalyst element 102 under operating conditions. It is desirable that plate 110 is not warped during fabrication. Wall 182 may provide a generally flat surface for adequate seal. In one embodiment, plate 110 may have a thickness of ¼ in. The wider portion of Collar 126 may have a width of about 3 in.

Plate 112 may be identical to plate 110, thus each of plates 110 and 112 may provide a support wall (one as an inlet wall and the other as an outlet wall) for supporting a respective catalyst element. The catalyst elements may be independently mounted to plates 110 and 112.

A fixture assembly 128 is provided for securing catalyst element in position. Fixture assembly 128, as better shown in FIGS. 5 to 9, may include anchoring arms 130A, 130B (also individually and collectively referred to as 130), pressure bars 132A, 132B (also individually and collectively referred to as 132), bolts 134A, 134B (also individually and collectively referred to as bolts 134), nuts 136A, 136B (also individually and collectively referred to as 136), and washer-gasket units 186 (also individually referred to as 186).

Figure 11:
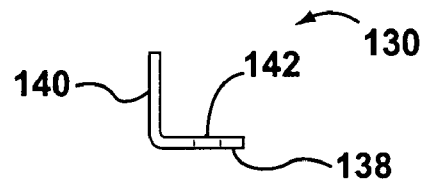
FIG. 11 is an elevation view of an anchoring arm.
Figure 12:
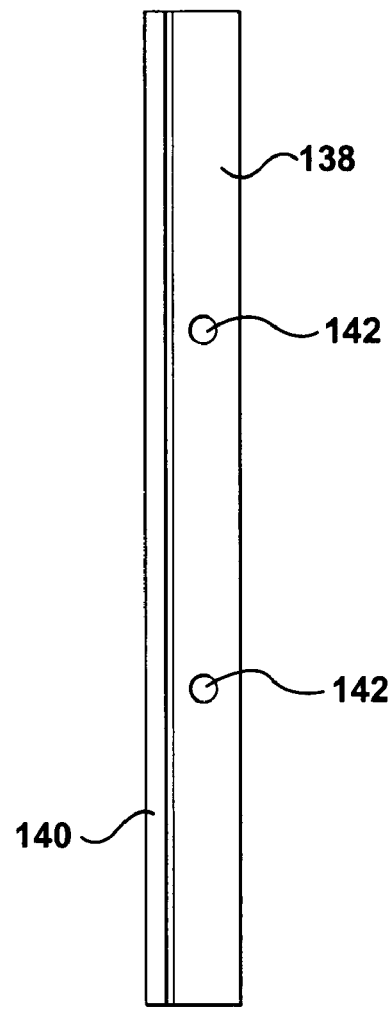
FIG. 12 is a top plan view of the anchoring arm of FIG. 11.

Anchoring arm 130 is individually shown in FIGS. 11 and 12. As depicted, each anchoring arm 130 may be formed of two joined plate members 138 and 140, or from angle iron. Plate members 138 and 140 may be joined to form a generally L-shaped support (angle iron). As can be appreciated, an L-shaped support can provide stable support (higher allowable bending stress) with less material. As depicted plate member 138 may have two spaced apart apertures 142. Arm 130 may be mounted on housing 100 such that it extends generally longitudinally from plate 110 with plate member 138 facing opening 114 or catalyst element 102 when it rests on collar 126. Each arm 130 is used to anchor an end of a pressure bar 132 which is generally transversely mounted. Arms 130 may be fixedly mounted on plate 110, such as being welded to plate 110. As depicted, arms 130 may be mounted to both plates 110 and 112, thus forming beams extending between the two plates. Alternatively, in some embodiments, the arms attached to each plate may be disconnected from the other plate.

The size of arm 130 may vary depending on the application. In one embodiment, plate members 138, 140 may have a thickness of 3/16 in to ¼ in, a length of 13 in, and respective width of 1 in×1¼ in. Arm 130 should be strong enough to stably anchor pressure bar 132 under operating conditions. For example, arm 130 may be made from carbon steel, or similar materials.

Figures 13, 14:
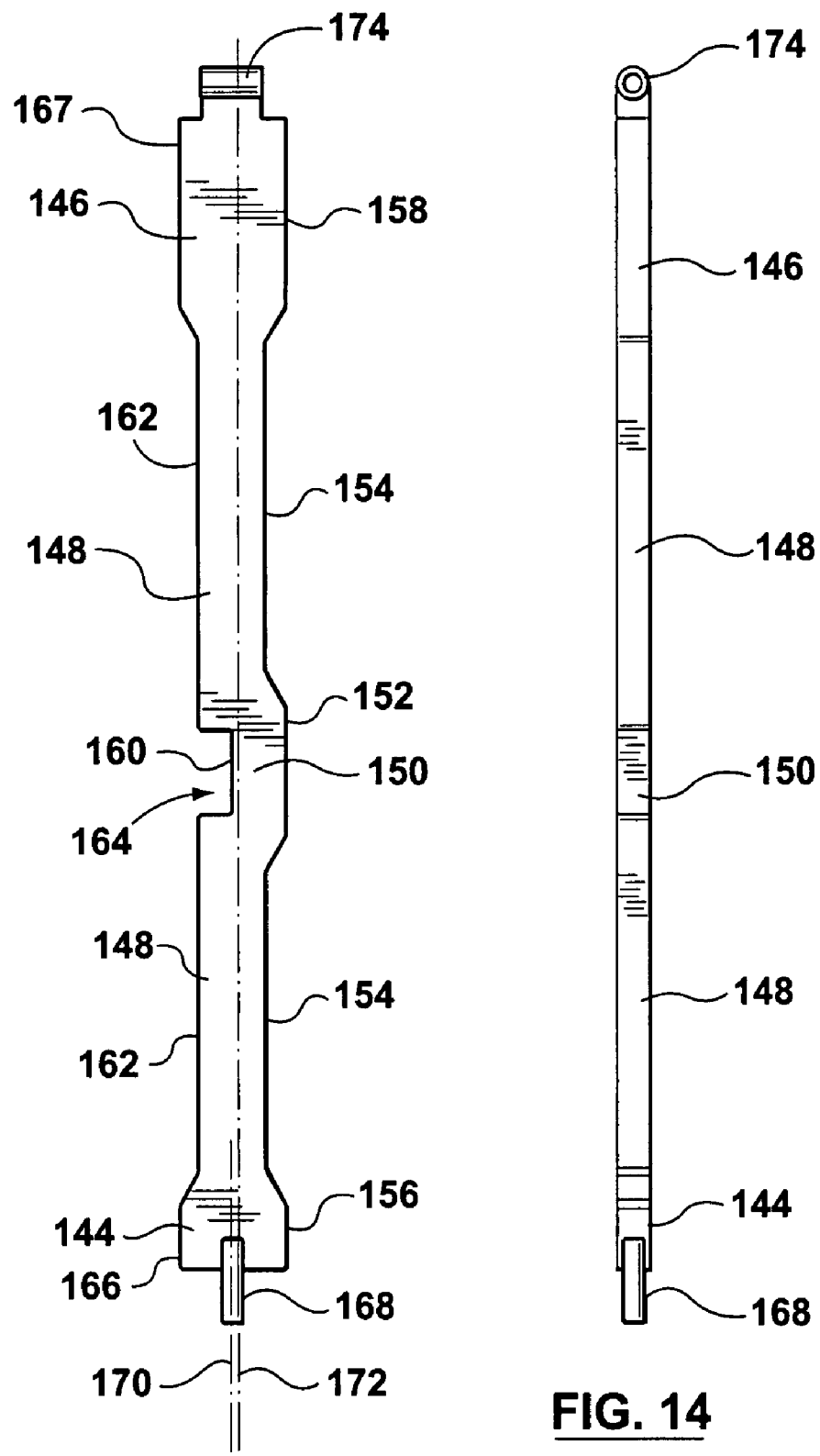
FIG. 13 is an elevation view of a pressure bar.
FIG. 14 is a left elevation view of the pressure bar of FIG. 13.
Figure 15:
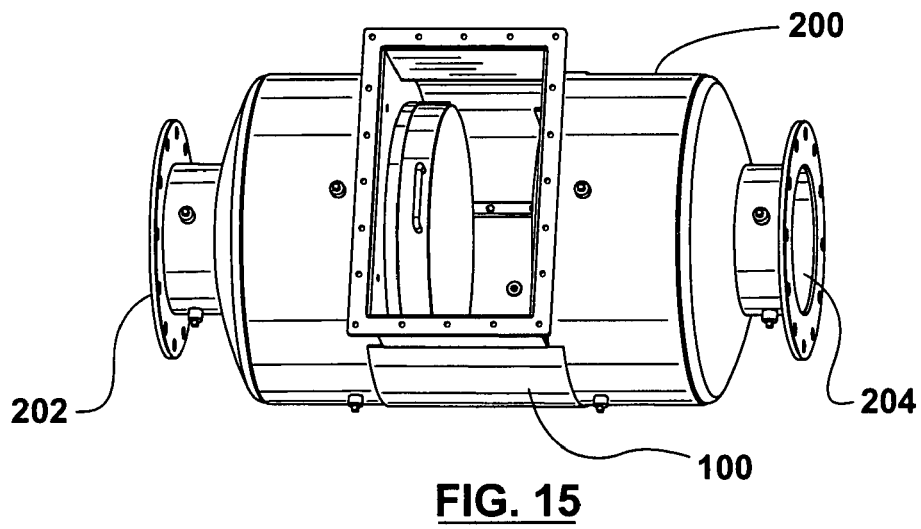
FIG. 15 is a top perspective view of a first catalytic converter, without the pressure bars and the cover.
Figure 16:
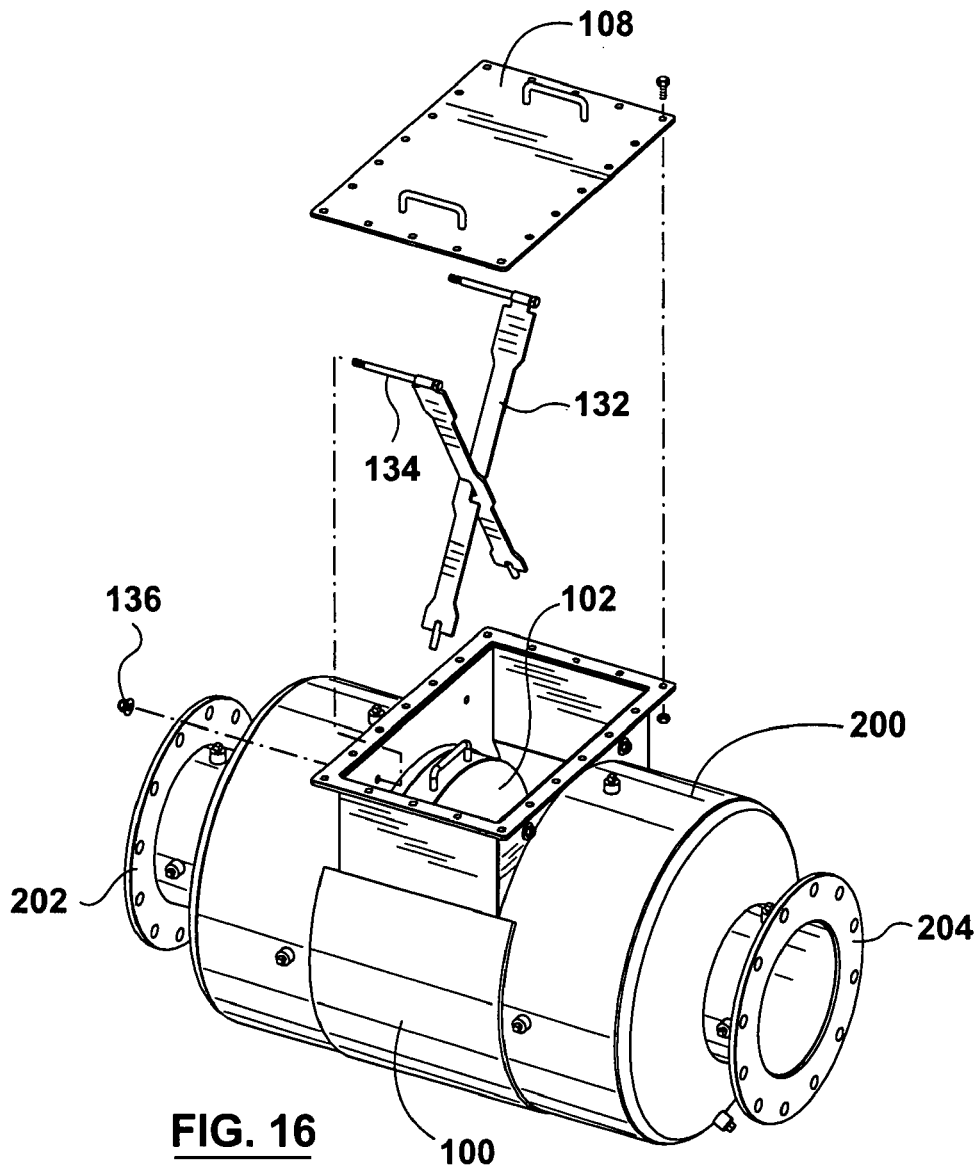
FIG. 16 is a side exploded perspective view of the catalytic converter of FIG. 15.
Figure 17:
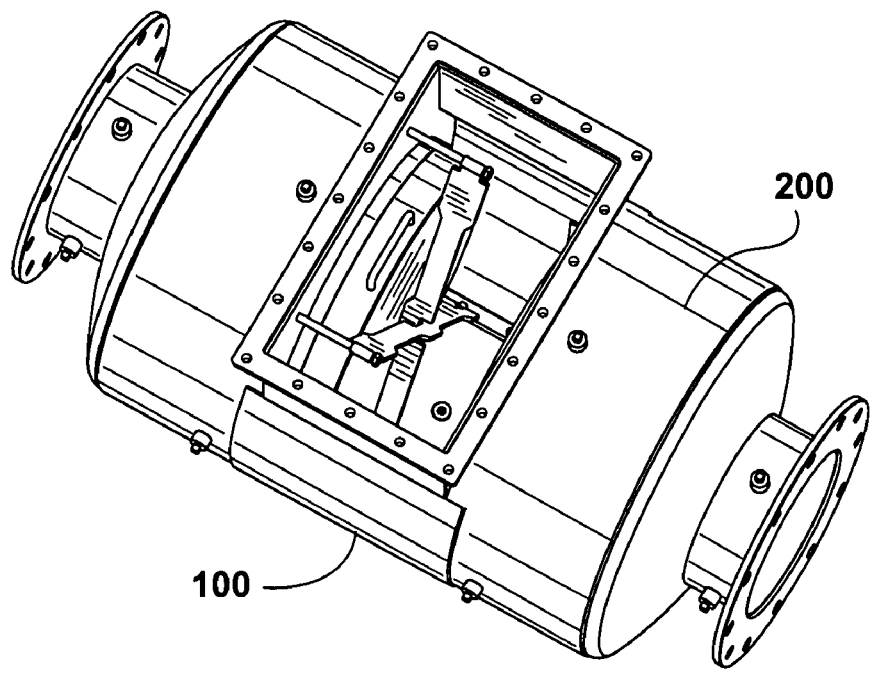
FIG. 17 is a top perspective view of the catalytic converter of FIG. 15, without the cover.

Pressure bar 132 is individually shown in FIGS. 13 and 14. Pressure bar 132 has end portions 144, 146, recessed portions 148 between the end portions, and a central portion 150. One edge 152 of central portion 150 protrudes laterally from the edges 154 of recessed portions 148 such that edge 152 and edges 156, 158 at end portions 144 and 146 longitudinally align with each other. The opposite edge 160 of central portion 150 is recessed laterally from the edges 162 of recessed portions 148, thus forming a notch 164. The edges 166, 167 of end portions 144, 146 align with each other. As can be appreciated and better seen in FIGS. 1 and 6, notch 164 allows two pressure bars 132 be cross-aligned and pressured against the same catalyst element 102.

A pin 168 may extend longitudinally from end portion 144 in a line 170 that may be offset from the central axis 172 which is parallel and at a equal distance from edges 166 and 167. As depicted pin 168 has a circular cross-section. In other embodiments, pin 168 may have a different cross-section, such as oval, square, or the like. Pin 168 is sized so that it can be slidably inserted into and releaseably engage aperture 142, such that end portion of 144 of pressure bar 132 is removably anchored relative to plate 110 and is pivotally connected to housing 100. Allowing pin 168 to slide and swing or pivot about when received in aperture 142 of arm 130 makes it easier to align end portion 146 of pressure bar 132 into position.

End portion 146 of pressure bar 132 has a sleeve 174 for receiving the shank 176 of a bolt 134. Sleeve 174 is small enough so that the head 178 of bolt 134 will not pass through.

The dimensions of pressure bar 132 may vary and can be readily selected by persons skilled in the art depending on the application. In one embodiment, pressure bar 132 may be made of stainless steel or similar materials, and may have a length of about 27 13/16 in and a width of about 2 9/16 in. Pin 168 may be a rod with a length of about 2 in and a diameter of about 0.5 in. Sleeve 174 and recessed portions 148 may have a width of about ¾ in. Pressure Bar 132 may have a thickness in the range of 3/16 in to 3/8 in.

In one embodiment, bars 132A and 132B may have identical sizes and shapes. In another embodiment, bars 132A and 132B may have similar general shapes but sized differently so that when they are "flipped" or reversed in position, the distance from pins 168 to wall 182 is slightly different.

Any suitable type of bolt and nut combination may be used for bolting bars 132 to plate 110. Bolt 134 and nut 136 may have any suitable shape, size and threading. The material of bolt 134, however, should be selected with care so that it is strong enough to withstand the applied force under the normal operating conditions and has a desired thermal expansion coefficient, as will be discussed below.

In one embodiment, bolt 134 may be made of carbon steel or similar materials, and may have a length of about 6 in, and shank 176 of bolt 134 may have a diameter of about ½ in. Nut 136 and threaded end 179 of bolt 134 have matching sizes and threads for proper engagement.

Figure 8:
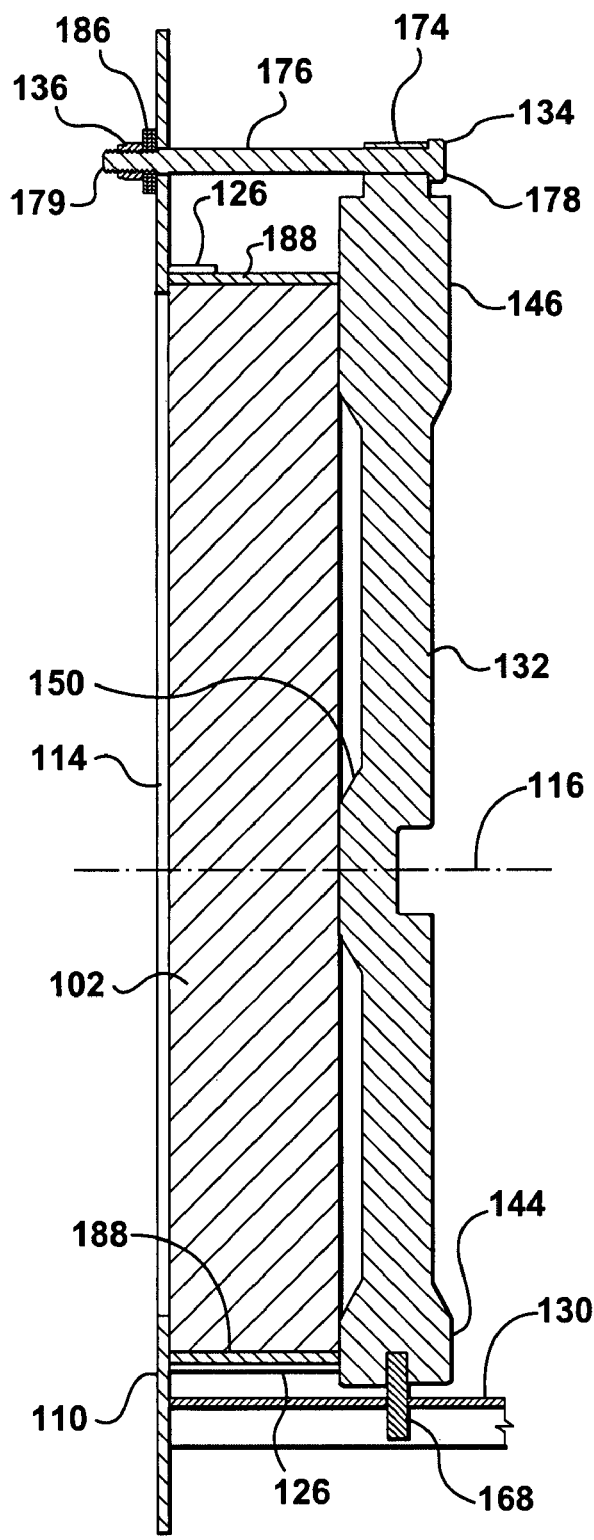
FIG. 8 is a cross-sectional view of the portion of FIG. 5, taken along the line 8-8.
Figure 9:
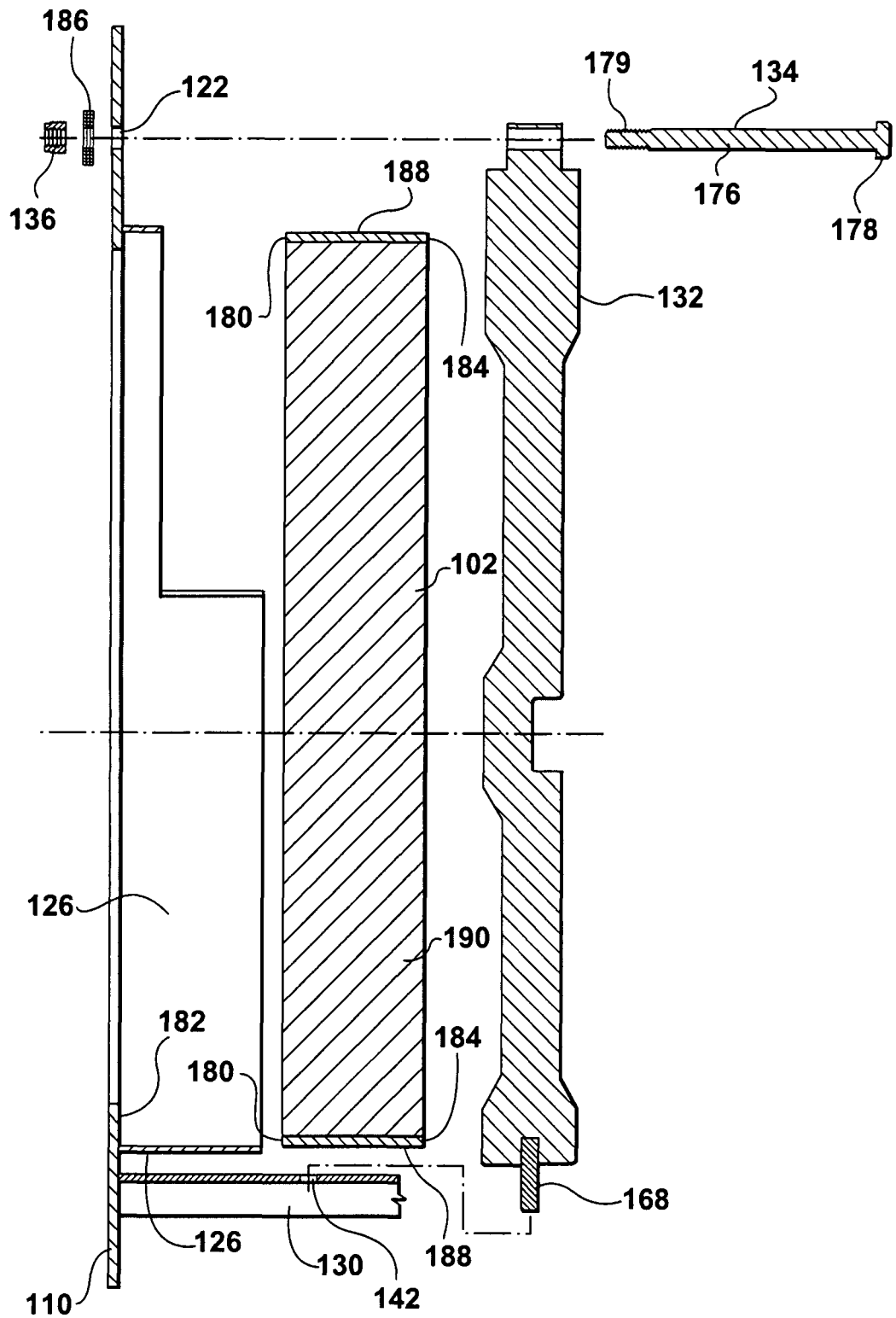
FIG. 9 is an exploded view of the parts shown in FIG. 8.

As better shown in FIGS. 8 and 9, when installed, the front face 180 of catalyst element 102 abuts a rear wall 182 of plate 110. Pressure bar 132 is positioned across and abuts portions of the rear face 184 of catalyst element 102. End portion 144 of bar 132 is anchored to plate 110 as pin 168 is received in aperture 142 of arm 130 which restricts the movement of end portion 144. End portion 146 is bolted to plate 110 using bolt 134 and nut 136 so that pressure bar 132 and plate 110 clamp catalyst element 102 therebetween. A washer-gasket unit 186 may be placed between plate 110 and nut 136, with the gasket side facing plate 110 and the washer side facing nut 136, to prevent leakage of exhaust gas through bore holes 122, 124.

The locations of arms 130 and bore holes 122 may be selected so that when installed, longitudinal axes 172 of pressure bars 132A and 132B are aligned with each other at an angle from 30 to 90 degrees. In one embodiment, longitudinal axes 172 may be aligned at about 90 degrees.

Typically, catalyst element 102 has an outer rim frame 188 and an inner catalyst core 190 attached to frame 188. Frame 188 is made of a rigid and strong material such as stainless steel. Inner core 190 may have a substrate and the suitable catalyst material is coated thereon. For example, the catalyst material may be effective for converting CO to $CO_2$. Frame 188 protects core 190 and is typically of substantially the same width as core 190, so that when catalyst element 102 abuts plate 110, the abutting pressure is mainly born by frame 188.

As can be understood, as frame 188 of catalyst element 102 is of substantially the same width as inner core 190, after initial installation pressure bars 132 contact catalyst element 102 at four contact points on frame 188. Thus, clamping pressures are applied to catalyst element 102 through frame 188.

FIGS. 8 and 9 showed only one pressure bar 132 with its notch 164 facing away from catalyst element 102, which corresponds to pressure bar 132A. The other pressure bar, pressure bar 132B, is installed with its notch facing pressure bar 132A and catalyst element 102. Due to the interfacing notches, both pressure bars 130A and 132B abuts frame 188 of catalyst element 102, at four different contact points. With four contact points, axial movement of catalyst element 102 is effectively and securely restricted. While a single pressure bar 132 may be used in some embodiments, with two pressure points, the pressure applied to the catalyst element (frame 188) is less evenly distributed and gas may leak between frame 188 and plate 110 during operation in some situations.

When bolt 134 and nut 136 are sufficiently tightened, a sufficient force is exerted on catalyst element 102 so that catalyst element 102 is held in compression between plate 110 and pressure bar 132 and sealingly engages wall 182 of plate 110. The clamping force, and thus the compression of catalyst element 102, can be easily adjusted by rotating nut 136 relative to bolt 134, or vice versa.

The longitudinal position of aperture 142 may be selected so that the pressure applied to frame 188 at the top proximate bolt 134 by end portion 146 of pressure bar 132 is substantially the same as the pressure exerted at the bottom of frame 188 proximate arm 130 by end portion 144 of pressure bar 132.

In one embodiment, the materials for plate 110, arm 130, bar 132, bolt 134 may be selected such that, for a given catalyst element 102, the thermal expansion coefficients of these parts are such that the force exerted on catalyst element 102 by plate 110 and bar 132 is higher at a higher temperature. Thus, even when bolt 134 and nut 136 are not initially tightened sufficiently to create a sealing engagement between catalyst element 102 and wall 182 at room temperature during installation, at the normal operating temperature during operation, which is elevated due to the hot exhaust gas, a sealing engagement is conveniently obtained due to the increased force exerted on catalyst element 102.

Housing 100 may be used in a suitable catalytic converter, as illustrated in FIGS. 15 to 26.

FIGS. 15 to 18 illustrate a stand-alone catalytic converter 200 which includes housing 100. Catalytic converter 200 has an inlet 202 for receiving an exhaust gas and an outlet 204 for ejecting treated exhaust gas, and defines a fluid path for the gas to go through. Housing 100 is situated between inlet 202 and outlet 204 so that the exhaust gas goes through openings 114 and 118, and catalyst element 102 when it is installed.

Convert 200 may be built using materials selected so that the converter may be repeatedly operated at temperatures up to 1200° F.

In use, arms 130 may be pre-installed in housing 100. To install a catalytic element, cover 108 is removed, exposing flow chamber 104 and access channel 106. Catalyst element 102 is lowered into flow chamber 104 through access channel 106, and rests on collar 126 so that its front face 180 abuts rear wall 182 of plate 110 (as shown in FIG. 8). Conveniently, the narrower top portion of collar 126 allows easy access. After catalyst element 102 is put in position, pin 168 of bar 132 is inserted into aperture 142 of arm 130. As can be appreciated, when aperture 142 and pin 168 are properly sized, pressure bar 132 may swing about while pin 168 is engaged with aperture 142, so as to allow enough room for the user to manipulate catalyst element 102 in flow chamber 104. In any case, after catalyst element 102 is in position and pins 168 are inserted, pressure bars 132 are positioned across and abut rear face 184 of catalyst element 102. Bar 132A is installed with its notch 164 facing away from catalyst element 102 and bar 132B is installed with its notch 164 facing catalyst element 102. Bars 102 are positioned so that sleeves 174 align with corresponding bore holes 122, 124. A bolt 134 is then inserted into sleeve 174 of each bar 132 and the corresponding bore hole 122/124. Washer-gasket units 186, when used, are next put in place. Nuts 136 are then coupled to threaded ends 179 of bolts 134 to tighten the bolt joint and clamp plate 110 and bars 132 so that plate 110 and bars 132 in turn clamp catalytic element 102 with a desired pressure. As can be appreciated, the enlarged head 178 of bolt 134 and nut 136 may be flipped in some cases. The orientation of bolts 134 may be selected depending on convenience and available space.

During installation, as discussed above, in some embodiments it may not be necessary that the bolt joint is initially tightened to a great extent. In some embodiments, the position of aperture 142 may be selected such that, due to restriction of the movement of end portion 144 of pressure bar 132 by arm 130, the engagement or sealing between catalyst element 102 and plate 110 may be less tight after initial installation than is required during operation. Conveniently, thermal expansion at elevated operating temperatures can automatically further tighten the bolt joint thus providing the necessary pressure to form a sealing engagement between catalyst element 102 and plate 110. Thus, all exhaust gas will pass through catalyst element 102 and will not leak through a gap between catalyst element and plate 110.

As pins 168 are positioned off-center on bars 132, when bars 132 are flipped, the distance from the nearer edge of bar 132 to wall 182 is slightly different. Depending on the particular catalyst element used, the orientation of pressure bars 132 may be reversed to accommodate the particular thickness of a given catalyst element, which due to machine tolerance may vary to a certain extent. For instance, pressure bars 132 may be designed to allow up to 1/16 in variation in the thickness of catalyst element 102.

After catalyst element 102 is secured in position, cover 108 is reinstalled in position to close off housing 102. As is conventional, a seal/gasket (not shown) may be provided between cover 108 and housing 100 to prevent leakage of gas through gaps between cover 108 and housing 100.

Figure 18:
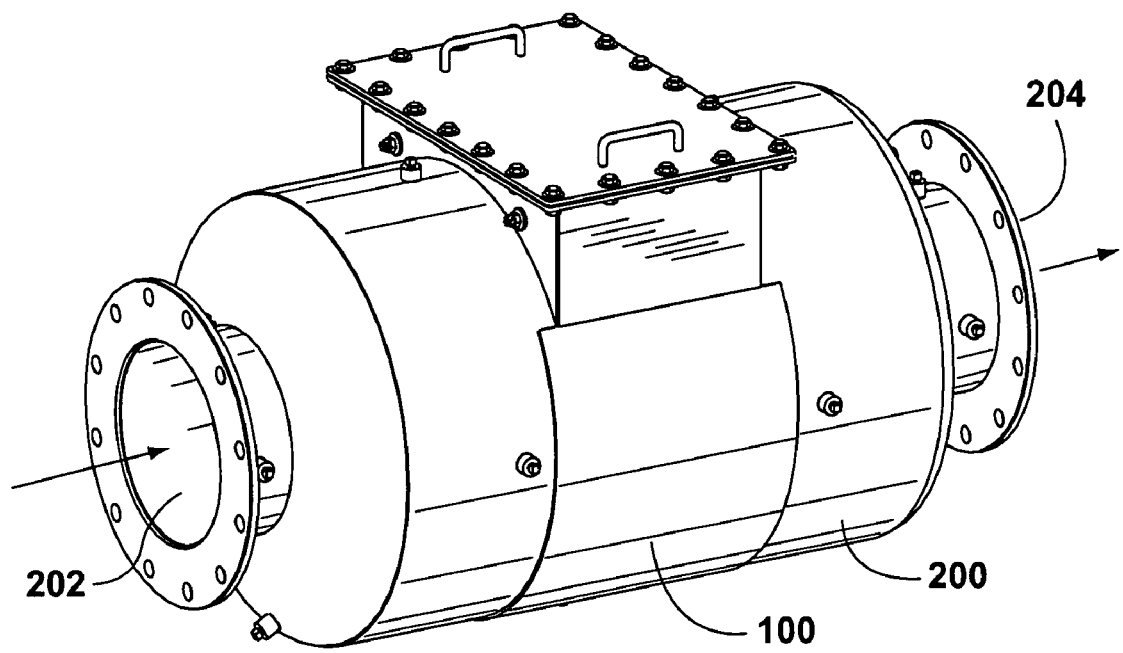
FIG. 18 is a side perspective view of the catalytic converter of FIG. 15.

During operation, exhaust gas enters converter 200 through inlet 202 and exits from outlet 204, as shown by the arrows in FIG. 18. As the hot exhaust gas passes through flow chamber 104 of housing 100, it heats the components in housing 100. During normal operation of a typical catalytic converter, the operating temperature in housing 100 may reach, for example, from 400° F. to 1500° F., and typically about 900° F. The heated components therefore expand. As discussed above, the axial thermal expansion of arms 130 and bolts 134 is less than the total axial thermal expansion of plate 110, catalyst element 102 and pressure bars 132 at the operating temperature. As a result, catalyst element 102 is more tightly pressed against plate 110, thus creating a tighter seal therebetween.

To achieve the desired tight seal during operation, the various components may be formed of different materials with different thermal expansion coefficients. For example, bolts 134 and arms 130 may be made of carbon steel, with an average thermal expansion coefficient of about $7.6 \times 10^{-6}$ in/in. ° F.; the frame of catalyst element 102, plate 110, and pressure bars 132 may be made of stainless steel, with an average thermal expansion coefficient of about $9.6 \times 10^{-6}$ in/in. ° F. The thermal expansion coefficients may be selected, such as within the range of $5 \times 10^{-6}$ to $11 \times 10^{-6}$ in/in. ° F., to adjust the pressure exerted on catalyst element 102 and plate 110 during operation.

Conveniently, the slidable engagement between aperture 142 of arm 130 and pin 168 of pressure bar 132 allows for thermal expansion of pressure bar 132 along its longitudinal direction at high temperatures. To this end, aperture 142 and pin 168 should be sized such that at the operating temperatures, pin 168 can still slide within aperture 142. This will prevent distortion of pressure bar 132 due to thermal expansion at high temperatures.

As depicted in the drawings, no gasket or seal is placed between catalyst element 102 and plate 110. Even without the gasket or seal, tight seal can be obtained due to the axial pressure exerted on catalyst element 102 by pressure bars 132. However, in some embodiments, a gasket or seal (not shown) may be placed between plate 110 and catalyst element 102. The gasket/seal may need to be replaced after the pressure on the catalyst element is released or when the catalyst element is removed/replaced.

When desired, catalyst element 102 may be removed from housing 100. To do so, cover 108 is first removed. Nuts 136 and bolts 134 are removed to un-tighten pressure bars 132. Pressure bars 132 may be removed or ends 146 may be swung towards rear plate 112 to provide some space to allow catalyst element 102 to be disengaged from front plate 110 and taken out through access channel 106.

Figure 19:
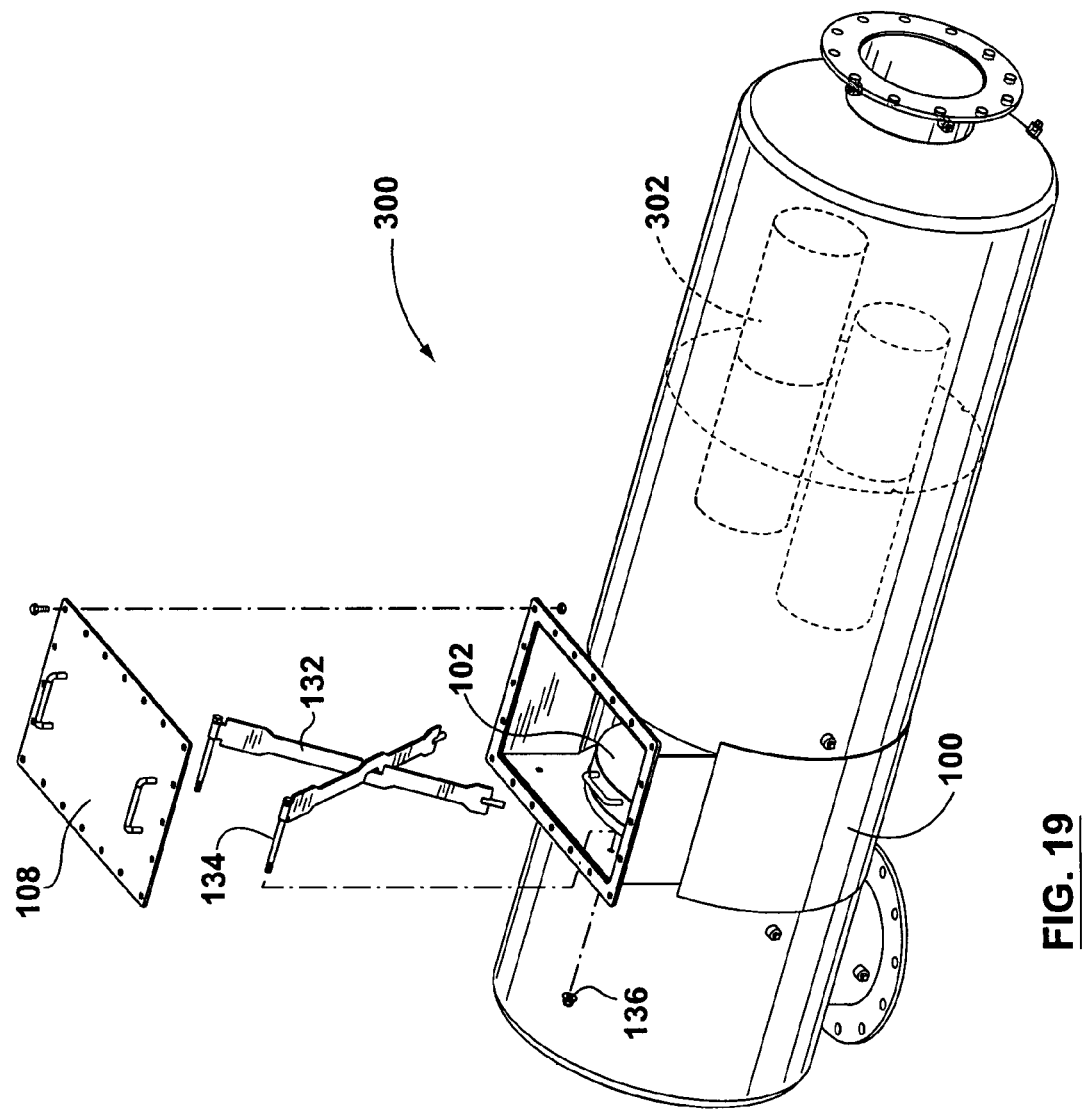
FIG. 19 is a partially see-through and partially exploded perspective view of a second catalytic converter.

FIGS. 19 to 21 illustrate a combination catalytic converter 300 which includes both housing 100 and a silencer 302 for noise reduction. As depicted, housing 100 is positioned upstream of silencer 302. In different embodiments, silencer 302 may be positioned either upstream or downstream of housing 100.

In use, catalyst element 102 may be installed into converter 300 in a similar manner as for converter 200, as illustrated in FIG. 19.

As depicted in FIGS. 19 to 21, housing 100 may be installed so that access channel 106 is on top. In a different embodiment, housing 100 may be constructed and installed so that access channel 106 is inclined as illustrated in FIG. 22 so that it opens to the side. The orientation of access channel 106 may be selected depending on the application and convenience.

Converter 300 conveniently provides both emission control and noise reduction with an integrated unit, and can be used as a muffler.

Figure 24:
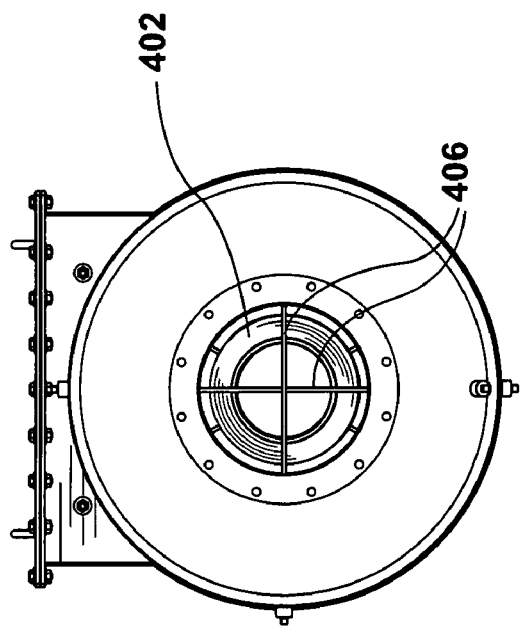
FIG. 24 is a left elevation view of the catalytic converter of FIG. 23.
Figure 23:
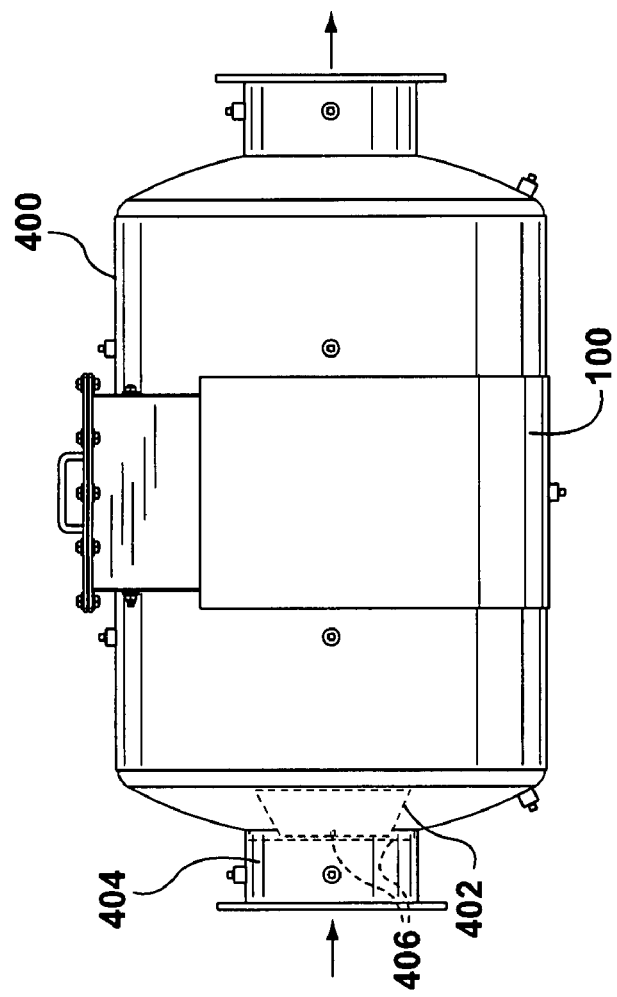
FIG. 23 is a partially see-through elevation view of a third catalytic converter.

FIGS. 23 and 24 illustrate another stand-alone catalytic converter 400 with housing 100, which includes a flow distributor or expander 402 positioned upstream of housing 100. Expander 402 is a cone shaped tube positioned at or near the inlet 404 and may be substantially co-axial with the inlet opening. Expander 402 may be mounted on cross-beams 406 which are in turn affixed to inlet 404. The size and shape of expander 402 and the distance between expander 402 and catalyst element 102 may be selected to provide uniform flow distribution over front face 180 of catalyst element 102.

Figure 25:
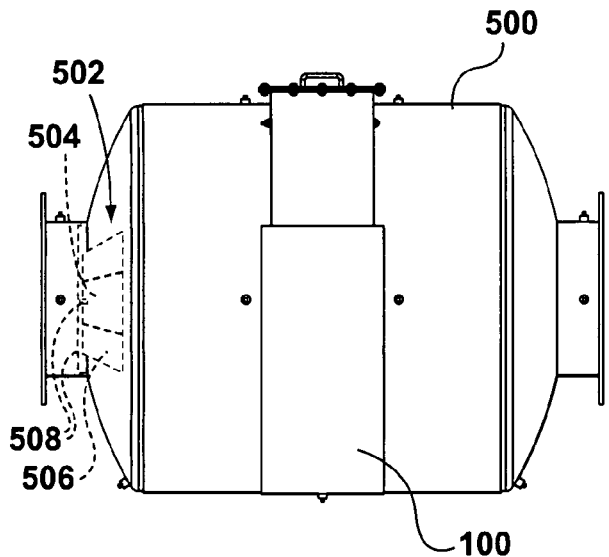
FIG. 25 is a partially see-through elevation view of a fourth catalytic converter.
Figure 26:
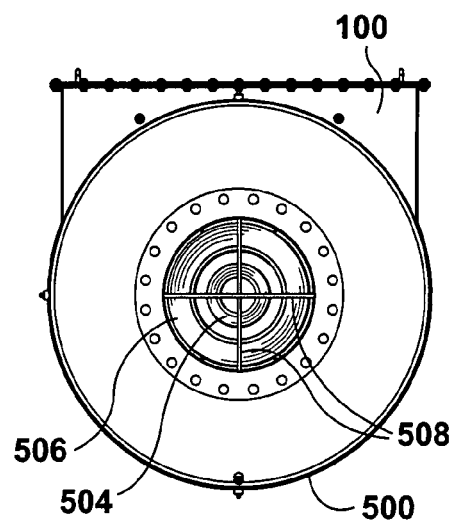
FIG. 26 is a left elevation view the catalytic converter of FIG. 25.

FIGS. 25 and 26 illustrate another catalytic converter 500 with housing 100 and a nested expander 502. As depicted, two cone-shaped tubes 504, 506 are nested. In other embodiments more than two expander tubes may be nested to provide improved flow distribution. Expander 502 may be mounted on cross-beams 508.

For instance, for a given application, Computational Fluid Dynamics (CFD) analysis may be performed using Finite Element Analysis (FEA) techniques to determine the size and shape of expander 402, 502. Expander 402 or 502 may be made of a material similar to that used for housing 100, such as stainless steel, carbon steel, or the like.

Figure 27:
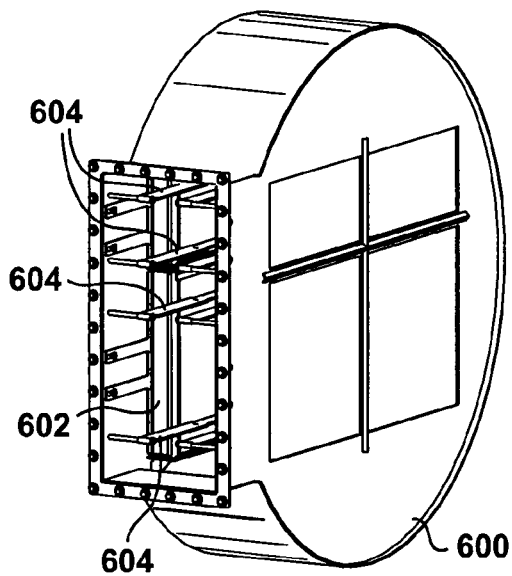
FIG. 27 is a perspective view of another housing, for housing a rectangular catalyst element arrangement.
Figure 28:
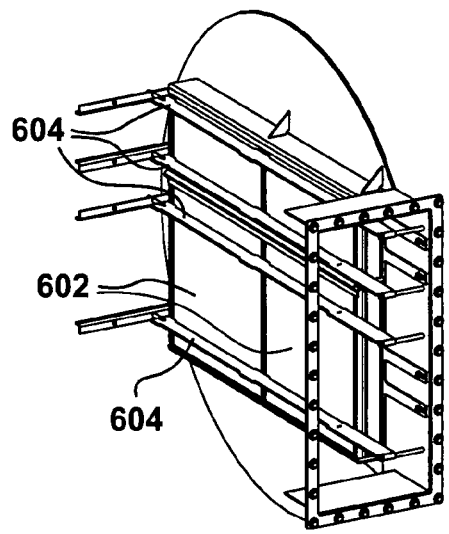
FIG. 28 is a cutaway view of a portion of the housing of FIG. 27.

As now can be understood, housing 100 may be modified. For example, the housing may have a rectangular opening instead of a circular opening, as illustrated in FIGS. 27 and 28. As shown, housing 600 can accommodate generally rectangular catalyst elements 602. In this case, more than two pressure bars 604 may be used to secure each catalyst element 602. Pressure bars 604 may be positioned across one another or parallel with each other, as depicted. When desired, multiple catalyst elements 602 may be positioned side by side, and both inlet and outlet openings of housing 600 may be provided with catalyst elements 602, as depicted. In alternative embodiments, the cross-sections of the catalyst element (s) and the housing may have the general shapes of a different polygon or other suitable shapes.

Other modifications are also possible. As can also be appreciated, bars 132 may be bolted to plate 110 in different manners in different embodiments. For example, it may not be necessary to use nut 136. In one embodiment, bore hole 122, 124 may be threaded and properly sized so that it can threadedly engage threaded end 179 of bolt 134. In another embodiment, a bolt body may be fixedly mounted on plate 110 with a threaded end extending through sleeve 174 of pressure bar 132. A nut may be engaged with the threaded end thus bolting pressure bar 132 to plate 110. The bolt body may be welded to plate 110. Such an embodiment may be utilized when the bolt bodies would not obstruct the mounting and dismounting of the catalyst element, such as when rectangular catalyst elements are used.

Arms 130 may be replaced with another form of anchorage that can releasably anchor an end of the pressure bar. In one embodiment, a bore or slot may be provided in the housing wall or a support arm for releaseably engaging an end of a pressure bar. In another embodiment, an end of the pressure bar may be hingedly mounted to a housing wall. The end of the pressure bar may be removably anchored or fixedly anchored, and may be pivotally connected to housing a different pivotal connection mechanism. In some embodiments, it may be more convenient if the pressure bar can be removed and replaced easily. The anchorage may also have a different shape as arm 130. For example, the anchoring arm may have a generally cylindrical or rectangular cross-section, or the like.

In one embodiment, both ends of the pressure bar may be bolted to plate 110.

As depicted, collar 126 may form a ring for holding catalyst element 102 and limiting its lateral movement relative to the axial direction of opening 114. The bottom portion of the ring may be wider to provide better support, while the top portion of the ring is narrower to provide easy access. In different embodiments, the collar may have a different shape and it may not be necessary that it forms a complete ring.

As can be appreciated, more than two catalyst elements may be installed into flow chamber 104.

As can be appreciated, embodiments of the present invention have certain advantages. For instance, in the embodiments shown in the figures, installation and removal of catalyst element 102 is relatively simple and convenient. The catalyst element can thus be conveniently inspected, maintained or replaced. The fixture assembly has a simple construction and can use commonly available material and parts to construct. Modification of the structure is also relatively easy. For example, bolts of different lengths may be used which are readily available. It also does not require specialized tools to install or remove the pressure bars. The catalyst element is fairly stably secured using the bolts and the applied pressure or force can by easily adjusted. Even when the catalyst elements used have slightly varying sizes (particularly thickness), such as due to machine tolerance, good sealing between the catalyst elements and the front plate can be achieved during operation.

The diameter of catalyst element 102 may also vary within a wide tolerance range such as from −⅛ in to +¼ in. Fixture assembly 128 is flexible enough to accommodate such, or even higher, variations.

As can also be understood by persons skilled in the art, some commercially available catalyst elements have cores that can expand significantly during operation. For example, the central portion of the core can sometimes telescope due to the pressure and heat applied to it by the exhaust gas. Conveniently, restriction bar 120 and the projected central portion 150 of pressure bars 132 can limit expansion or telescoping of the catalyst core.

Other features, benefits and advantages of the embodiments described herein not expressly mentioned above can be understood from this description and the drawings by those skilled in the art.

The contents of each reference cited above are hereby incorporated herein by reference.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A catalytic converter comprising:
    a housing defining a conduit and having a support wall defining an opening in said conduit;
    a removable catalyst element covering said opening for treating an exhaust gas passing through said conduit, a first side of said catalyst element abutting a surface of said support wall adjacent to the periphery of said opening;
    a removable bar abutting a second, opposite side of said catalyst element;
    an anchorage anchoring a first end of said bar to said wall; and
    a bolt bolting a second end of said bar to said wall with a threaded engagement to press said catalyst element against said surface of said wall, thus clamping said catalyst element between said wall and said bar,
    wherein said bolt and threaded engagement are configured such that when said threaded engagement is tightened, the clamping force applied by said bar to press said catalyst element against said wall is increased,
    wherein said bar, wall, anchorage and bolt are formed from respective materials having different thermal expansion coefficients, said materials selected so that said clamping force increases with increasing temperature, and said clamping force is sufficiently strong at an elevated operating temperature that said catalyst element sealingly engages said wall, to prevent leakage of said gas through a gap between said surface of said wall and said catalyst element.

2. The catalytic converter of claim 1, wherein said first end of said bar is removably anchored to said wall.

3. The catalytic converter of claim 2, wherein said anchorage is mounted in said housing, and has an aperture releaseably receiving and engaging said first end of said bar thus anchoring said first end.

4. The catalytic converter of claim 3, wherein said anchorage comprises an elongated arm extending from said wall, said arm having two joined plate members forming a generally L-shaped cross-section, one of said plate members facing said catalyst element and having said aperture.

5. The catalytic converter of claim 3, wherein said first end of said bar has a pin, said pin slidably received in said aperture of said anchor support.

6. The catalytic converter of claim 5, wherein said bar has two opposite edges, one of said edges abutting said catalyst element, said pin extending along a line between, and generally parallel, to said edges, said line being closer to one of said edges.

7. The catalytic converter of claim 1, wherein said bar has a recessed portion between said ends, said recessed portion being spaced from said catalyst element to allow passage of said gas.

8. The catalytic converter of claim 7, wherein said bar has a central portion protruding from said recessed portion towards said catalyst element for restricting expansion of a central portion of said catalyst element.

9. The catalytic converter of claim 1, wherein said second end of said bar has a sleeve, said bolt extending through said sleeve.

10. The catalytic converter of claim 9, comprising a nut and a support plate, said support plate forming said wall and having an aperture, said bolt extending through said aperture and being coupled to said nut such that said bolt and said nut clamp said plate and said bar therebetween.

11. The catalytic converter of claim 10, comprising a washer-gasket unit placed between said nut and said support plate.

12. The catalytic converter of claim 1, comprising a restriction bar mounted in said housing and across said opening of said wall, for restricting expansion of a central portion of said catalyst element.

13. The catalytic converter of claim 1, wherein said catalyst element comprises a peripheral frame and a catalyst core mounted to said frame, said frame bearing the clamping force applied to said catalyst element by said bar and said wall.

14. The catalytic converter of claim 13, wherein said frame is formed from a material selected from carbon steel and stainless steel.

15. The catalyst converter of claim 1, wherein said wall and said bar have a first thermal expansion coefficient, and said bolt and said anchorage have a second thermal expansion coefficient smaller than said first thermal expansion coefficient.

16. The catalyst converter of claim 15, wherein said first thermal expansion coefficient is about $9.6 \times 10^{-6}$ in/in. °F., and said second thermal expansion coefficient is about $7.6 \times 10^{-6}$ in/in. °F.

17. The catalytic converter of claim 15, wherein each one of said wall and said bar is made of stainless steel, and each one of said bolt and said anchorage is made of carbon steel.

18. The catalytic converter of claim 1, wherein said bar is a first bar, and said catalytic converter comprises a second bar having a first end anchored to said wall and a second end bolted to said wall thus clamping said catalyst element between said wall and said second bar.

19. The catalytic converter of claim 18, wherein each one of said first bar and second bar has a longitudinal axis, said longitudinal axes being aligned with each other at an angle from 30 to 90 degrees.

20. The catalytic converter of claim 18, wherein a central portion of each one of said first and second bars has a notch, said notches facing each other and being sized to allow said second bar to be positioned across said first bar.

21. The catalytic converter of claim 1, comprising a plurality of catalyst elements.

22. The catalytic converter of claim 1, wherein said support wall is an inlet wall and said opening of said support wall is an inlet opening, said housing has an outlet wall defining an outlet opening, and another catalyst element covering said outlet opening is clamped between said outlet wall and a pressure bar bolted to said outlet wall.

23. The catalytic converter of claim 1, comprising a flow distributor mounted in said housing upstream of said opening of said wall for distributing said gas over said opening, said flow distributor comprising a cone-shaped tube.

24. The catalytic converter of claim 23, wherein said flow distributor comprises a plurality of nested, cone-shaped tubes.

25. A catalytic converter comprising:
a housing defining a conduit and having support means for defining an opening in said conduit;
a removable catalyst element covering said opening for treating an exhaust gas passing through said conduit, a first side of said catalyst element abutting a surface of said support means adjacent to the periphery of said opening;
pressure means for abutting a second, opposite side of said catalyst element;
anchorage means for anchoring a first end of said pressure means to said housing; and
bolt means for bolting a second end of said pressure means to said support means, with a threaded engagement means to press said catalyst element against said surface of said support means, thus clamping said catalyst element between said support means and said pressure means,
wherein said bolt meanings and threaded engagement means are configured such that when said threaded engagement means is tightened, the clamping force applied by said pressure means to press said catalyst element against said support means is increased,
wherein said pressure means, support means, anchorage means and bolt means are formed from respective materials having different thermal expansion coefficients, said materials selected so that said clamping force increases with increasing temperature, and said clamping force is sufficiently strong at an elevated operating temperature that said catalyst element sealingly engages said support means, to prevent leakage of said gas through a gap between said surface of said support means and said catalyst element.

26. A method of securing a catalyst element in a catalytic converter, comprising:
providing a housing defining a conduit and having a support wall defining an opening in said conduit;
covering said opening with a removable catalyst element for treating an exhaust gas passing through said conduit, a first side of said catalyst element abutting a surface of said wall adjacent to the periphery of said opening; and
abutting a second, opposite side of said catalyst element with a pressure bar by anchoring a first end of said bar to said wall with an anchorage and bolting a second end of said bar to said wall with a bolt and a threaded engagement to press said catalyst element against said surface of said wall, thus clamping said catalyst element between said wall and said bar,
wherein said bolt and threaded engagement are configured such that when said threaded engagement is tightened, the clamping force applied by said bar to press said catalyst element against said wall is increased,
wherein said bar, wall, anchorage and bolt are formed from respective materials having different thermal expansion coefficients, said materials selected so that said clamping force increases with increasing temperature, and said clamping force is sufficiently strong at an elevated operating temperature that said catalyst element sealingly engages said wall, to prevent leakage of said gas through a gap between said surface of said wall and said catalyst element.

27. A catalytic converter comprising:
a housing defining a generally longitudinally oriented conduit extending between an inlet and an outlet, said housing having a generally transversely oriented support wall mounted in said conduit between said inlet and said outlet, said support wall having an opening permitting an exhaust gas to pass through said conduit;
a removable catalyst element covering said opening in said support wall for treating said exhaust gas passing through said conduit; said catalyst element having a front side facing said support wall and a rear opposite side; and
at least one member abutting and extending across said rear side of said catalyst element, said member having a first end pivotally connected to said housing and a second opposite end of said member connected with a bolt to said support wall wherein in use, said catalyst element is held in compression between said support wall and said member.

28. A catalytic converter as claimed in claim 27, wherein said bolt is adjustable to vary the compression of said catalyst element as it is held between said support wall and said member.

29. A catalytic converter as claimed in claim 27, wherein said second end of said member is adapted to releasably engage said housing.

30. A catalytic converter as claimed in claim 29, wherein said second end of said member has a pin receivable in an aperture in said housing.

31. A catalytic converter as claimed in claim 30 wherein said housing comprises a longitudinally extending arm member and wherein said aperture is in said arm member.

\* \* \* \* \*